(12) United States Patent
Jang

(10) Patent No.: US 11,830,976 B2
(45) Date of Patent: Nov. 28, 2023

(54) FLAME-RESISTANT ELECTROLYTE COMPOSITIONS, QUASI-SOLID AND SOLID-STATE ELECTROLYTES, AND LITHIUM BATTERIES

(71) Applicant: Global Graphene Group, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 60 days.

(21) Appl. No.: 17/157,331

(22) Filed: Jan. 25, 2021

(65) Prior Publication Data

US 2022/0238915 A1 Jul. 28, 2022

(51) Int. Cl.
*H01M 10/0565* (2010.01)
*H01M 10/44* (2006.01)
*H01M 10/0525* (2010.01)

(52) U.S. Cl.
CPC ... *H01M 10/0565* (2013.01); *H01M 10/0525* (2013.01); *H01M 10/44* (2013.01); *H01M 2300/0034* (2013.01); *H01M 2300/0082* (2013.01); *H01M 2300/0085* (2013.01)

(58) Field of Classification Search
CPC ........ H01M 10/0525; H01M 10/0565; H01M 10/44; H01M 2300/0034; H01M 2300/0082; H01M 2300/0085
See application file for complete search history.

(56) References Cited

U.S. PATENT DOCUMENTS

| | | | |
|---|---|---|---|
| 2,798,878 A | 7/1957 | Hummers | |
| 5,393,621 A * | 2/1995 | Chaloner-Gill | ... H01M 10/0565 |
| | | | 429/315 |
| 5,532,077 A | 7/1996 | Chu | |
| 9,059,481 B2 | 6/2015 | He et al. | |
| 9,368,831 B2 | 6/2016 | He et al. | |
| 9,601,803 B2 | 3/2017 | He et al. | |
| 9,601,805 B2 | 3/2017 | He et al. | |

(Continued)

FOREIGN PATENT DOCUMENTS

| | | | | |
|---|---|---|---|---|
| CN | 110120549 A | * | 8/2019 | ........ H01M 10/0525 |
| JP | 2001126726 A | * | 5/2001 | ........ H01M 10/0525 |

OTHER PUBLICATIONS

Machine Translation CN110120549(A) (Year: 2019).*
Machine Translation JP2001126726A (Year: 2001).*

*Primary Examiner* — Victoria H Lynch

(57) ABSTRACT

A rechargeable lithium battery comprising an anode, a cathode, and a quasi-solid or solid-state electrolyte in ionic communication with the anode and the cathode, wherein the electrolyte comprises a polymer comprising chains of a polyester of phosphoric acid and a lithium salt dissolved or dispersed in the polyester of phosphoric acid. The electrolyte may further comprise from 0.1% to 50% by weight of a non-aqueous liquid solvent dispersed in the polyester of phosphoric acid. The polymer may further comprise a flame-retardant and/or particles of an inorganic solid-state electrolyte. Also provided is an electrolyte composition comprising a lithium salt and an initiator and/or a crosslinking agent dissolved or dispersed in a reactive liquid medium comprising a reactive monomer or oligomer that is a precursor to a polyester of phosphoric acid.

24 Claims, 5 Drawing Sheets

(56) References Cited

U.S. PATENT DOCUMENTS

| | | | |
|---|---|---|---|
| 2010/0285374 A1* | 11/2010 | Lee | H01M 6/168 |
| | | | 429/324 |
| 2014/0147752 A1* | 5/2014 | Pratt | H01M 4/62 |
| | | | 429/317 |
| 2015/0325884 A1* | 11/2015 | Fukunaga | H01M 10/0587 |
| | | | 29/623.2 |
| 2017/0133716 A1* | 5/2017 | Masuda | H01M 10/0587 |
| 2019/0190065 A1* | 6/2019 | Abouali | H01M 50/403 |
| 2022/0223841 A1* | 7/2022 | Anstey | H01M 4/386 |

* cited by examiner

Discharged state (or as manufactured)

Charged state

FLAME-RESISTANT ELECTROLYTE COMPOSITIONS, QUASI-SOLID AND SOLID-STATE ELECTROLYTES, AND LITHIUM BATTERIES

The present invention provides a fire-resistant electrolyte composition, quasi-solid and solid-state electrolytes therefrom, and lithium batteries (lithium-ion and lithium metal batteries) containing such an electrolyte.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic, inorganic, organic-inorganic composite electrolytes. However, the conductivity of organic polymer solid state electrolytes, such as poly(ethylene oxide) (PEO), polypropylene oxide (PPO), poly(ethylene glycol) (PEG), and poly(acrylonitrile) (PAN), is typically low (<$10^{-5}$ S/cm).

Although the inorganic solid-state electrolyte (e.g., garnet-type and metal sulfide-type) can exhibit a high conductivity (about $10^{-3}$ S/cm), the interfacial impedance or resistance between the inorganic solid-state electrolyte and the electrode (cathode or anode) is high. Further, the traditional inorganic ceramic electrolyte is very brittle and has poor film-forming ability and poor mechanical properties. These materials cannot be cost-effectively manufactured. Although an organic-inorganic composite electrolyte can lead to a reduced interfacial resistance, the lithium ion conductivity and working voltages may be decreased due to the addition of the organic polymer.

The applicant's research group has previously developed the quasi-solid state electrolytes (QSSE), which may be considered as a fourth type of solid state electrolyte. In certain variants of the quasi-solid state electrolytes, a small amount of liquid electrolyte may be present to help improving the physical and ionic contact between the electrolyte and the electrode, thus reducing the interfacial resistance. Examples of QSSEs are disclosed in the following: Hui He, et al. "Lithium Secondary Batteries Containing a Non-flammable Quasi-solid. Electrolyte," U.S. patent application Ser. No. 13/986,814 (Jun. 10, 2013); U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

However, the presence of certain liquid electrolytes may cause some problems, such as liquid leakage, gassing, and low resistance to high temperature. Therefore, a novel electrolyte system that obviates all or most of these issues is needed.

Hence, a general object of the present invention is to provide a safe, flame/fire-resistant, quasi-solid or solid-state electrolyte system for a rechargeable lithium cell that is compatible with existing battery production facilities.

SUMMARY

The present disclosure provides a rechargeable lithium battery comprising an anode, a cathode, and a quasi-solid or solid-state electrolyte in ionic communication with the anode and the cathode, wherein the electrolyte comprises a polymer comprising chains of a polyester of phosphoric acid and a lithium salt dissolved or dispersed in the polyester of phosphoric acid, represented by the following structure (Chemical formula 1 or formula 2):

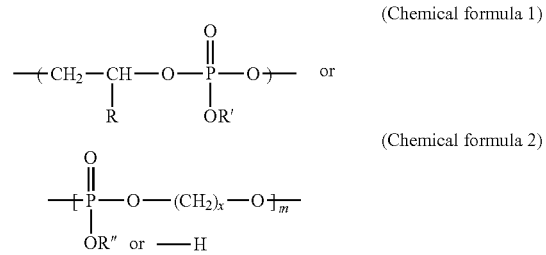

wherein (i) $3 \leq x \leq 10$, R is selected from Li, H, a methyl, ethyl, propyl, vinyl, allyl, acrylate, phenol, alkyl, aryl, or $CH_2Cl$, and R' or R" is independently selected from Li, $CH_3$, $C_2H_5$, n-$C_3H_7$, i-$C_3H_7$; n-$C_4H_9$, $CCl_3CH_2$, $C_6H_5$, —OH, —COOH, —O—CH$_2$CH$_2$—R''', C$_6$H$_5$, an alkyl, or an aryl, where R'''=—(CH$_2$)$_y$CH$_3$ and 0≤y≤10; or (ii) x=2, R is selected from Li, H, a methyl, ethyl, propyl, vinyl, allyl, acrylate, alkyl, aryl, or CH$_2$Cl, and R' or R" is independently selected from CH$_3$, C$_2$H$_5$, n-C$_3$H$_7$, i-C$_3$H$_7$; n-C$_4$H$_9$; CCl$_3$CH$_2$, C$_6$H$_5$, —OH, —COOH, vinyl, allyl, alkyl, aryl, or acrylate; and wherein the lithium salt occupies a weight fraction from 0.1% to 50% based on the total weight of the lithium salt and the polyester of phosphoric acid combined.

The monomers for the preparation of polyester of phosphoric acid include the two cyclic phosphate esters—phospholanes (I) and phosphorinanes (II)—five- and six-membered cyclic compounds, respectively and their derivatives. According to the UPAC nomenclature, the names of these compounds are 2-alkoxy (or phenoxy)-2-oxo-1,3,2-dioxaphospholane (I) and 2-alkoxy (or phenoxy)-2-oxo-1,3,2-dioxaphosphorinane (II).

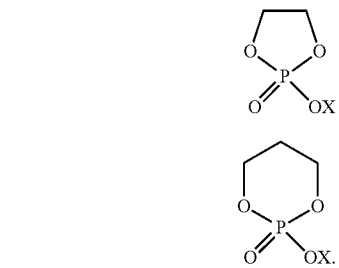

X = Alkyl; Aryl

In certain preferred embodiments, the lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoromethanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$ (CF$_2$CF$_3$)$_3$), lithium bisperfluoro-ethysulfonylimide (Li-BETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The electrolyte may further comprise from 0.1% to 50% (preferably 1%-30%) by weight of a non-aqueous liquid solvent dispersed in the polyester of phosphoric acid by weight, based on the total weight of the lithium salt, the polyester of phosphoric acid, and the non-aqueous liquid solvent combined.

The liquid solvent may be selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

The liquid solvent may be selected from fluorinated solvents, such as fluorinated vinyl carbonates, fluorinated esters, fluorinated vinyl esters, and fluorinated vinyl ethers. Fluorinated vinyl esters include R$_f$CO$_2$CH=CH$_2$ and Propenyl Ketones, R$_f$COCH=CHCH$_3$, where R$_f$ is F or any F-containing functional group (e.g., CF$_2$— and CF$_2$CF$_3$—).

Two examples of fluorinated vinyl carbonates are given below:

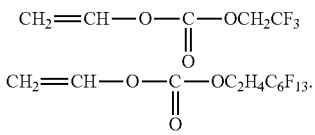

In some embodiments, the fluorinated carbonate is selected from fluoroethylene carbonate (FEC), DFDMEC, FNPEC, hydrofluoro ether (HFE), trifluoro propylene carbonate (FPC), methyl nonafluorobutyl ether (MFE), a combination thereof, wherein the chemical formulae for FEC, DFDMEC, and FNPEC, respectively are shown below:

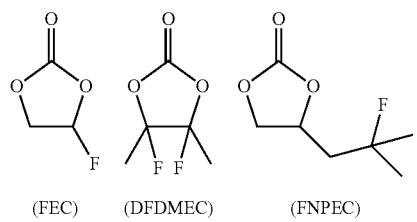

(FEC)   (DFDMEC)   (FNPEC)

Sulfone-based liquid solvents include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

In certain embodiments, the sulfone-based liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

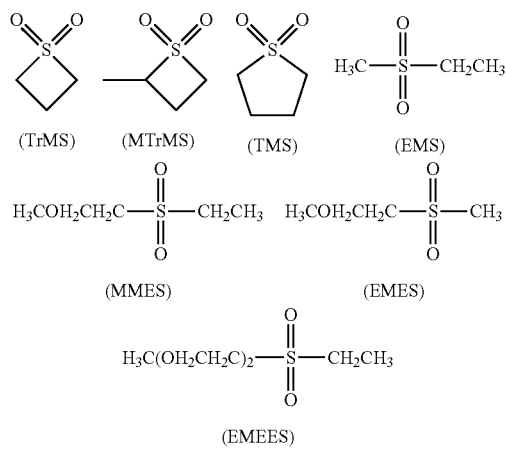

The nitrile may be selected from dinitriles, such as AND, GLN, and SEN, which have the following chemical formulae:

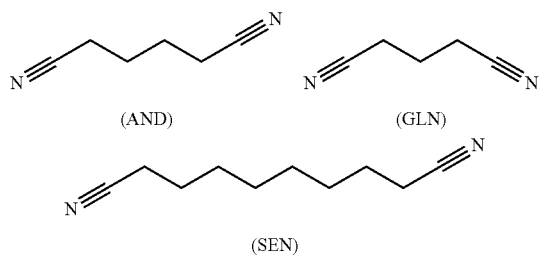

In some embodiments, the phosphate, phosphonate, phosphazene, phosphite, or sulfate as a liquid solvent is selected from tris(trimethylsilyl)phosphite (TTSPi), alkyl phosphate, triallyl phosphate (TAP), ethylene sulfate (DTD), a combination thereof. The phosphate, alkyl phosphonate, or phosphazene may be selected from the following:

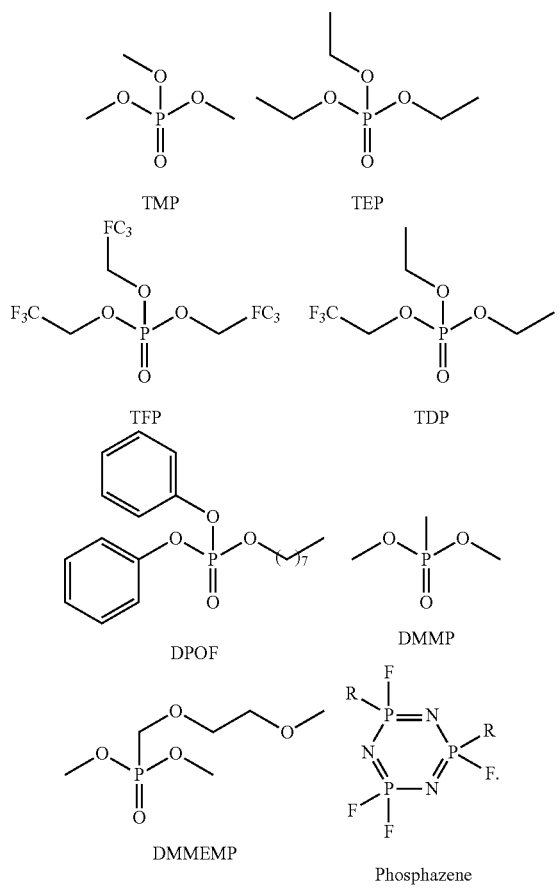

The siloxane or silane may be selected from alkylsiloxane (Si—O), alkylsilane (Si—C), liquid oligomeric silaxane (—Si—O—Si—), or a combination thereof.

The polymer in the electrolyte may comprise a network of crosslinked chains comprising a group selected from a hydroxyl group, an amino group, an imino group, an amide group, an acrylic amide group, an amine group, an acrylic group, an acrylic ester group, or a mercapto group in the polymer. The amide group may be selected from N,N-dimethylacetamide, N,N-diethylacetamide, N,N-dimethylformamide, N,N-diethylformamide, or a combination thereof.

The cathode in the disclosed lithium cell typically comprises particles of a cathode active material and the electrolyte permeates into the cathode and is in physical contact with substantially all the cathode active material particles.

In some preferred embodiments, the battery cell contains substantially no liquid solvent left therein (substantially all of the liquid monomer being polymerized to become a polymer). However, it is essential to initially include a liquid solvent in the cell (particularly if the precursor monomer itself is not in a liquid state), enabling the lithium salt to get dissociated into lithium ions and anions. A majority (>50%, preferably >70%) or substantially all of the liquid solvents is then removed after polymerization. With substantially 0% liquid solvent, the resulting electrolyte is a solid-state electrolyte. With less than 30% liquid solvent, we have a quasi-solid electrolyte. Both are highly flame-resistant.

A lower proportion of the liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

In some embodiments, the electrolyte further comprises a flame-retardant additive selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

In the electrolyte, the flame-retardant additive may be in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

The flame-retardant additive proportion in the polymer is preferably from 1% to 50%, more preferably from 10% to 30%.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. This second polymer may be pre-mixed into an anode and/or an cathode. Alternatively, this second polymer may be dissolved in the liquid solvent where appropriate or possible to form a solution prior to being injected into the battery cell.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The presently disclosed rechargeable lithium battery may be a lithium metal secondary cell, a lithium-ion cell, a lithium-sulfur cell, a lithium-ion sulfur cell, a lithium-selenium cell, or a lithium-air cell. This battery features a non-flammable, safe, and high-performing electrolyte as herein disclosed.

The rechargeable lithium cell may further comprise a separator disposed between the anode and the cathode. Preferably, the separator comprises a quasi-solid or solid-state electrolyte as herein disclosed.

The polymer may be initially in a liquid monomer state, which can be injected into the battery cell and then cured (polymerized and/or crosslinked) in situ inside the cell.

Alternatively, the reactive liquid mass (monomer or oligomer, along with the needed initiator and/or crosslinking agent) may be mixed with an electrode active material (e.g., cathode active material particles, such as NCM, NCA and lithium iron phosphate), a conducting additive (e.g., carbon black, carbon nanotubes, expanded graphite flakes, or graphene sheets), and an optional flame-retardant agent and/or optional particles of an inorganic solid electrolyte to form a reactive slurry or paste. The slurry or paste is then made into a desired electrode shape (e.g., cathode electrode), possibly supported on a surface of a current collector (e.g., an Al foil as a cathode current collector). An anode of a lithium-ion cell may be made in a similar manner using an anode active material (e.g., particles of graphite, Si, SiO, etc.). The anode electrode, a cathode electrode, and an optional separator are then combined to form a battery cell. The reactive monomer or oligomer inside the cell is then polymerized and/or crosslinked in situ inside the battery cell.

The electrolyte composition is designed to permeate into the internal structure of the cathode and to be in physical contact or ionic contact with the cathode active material in the cathode, and to permeate into the anode electrode to be in physical contact or ionic contact with the anode active material where/if present.

The flash point of the quasi-solid electrolyte is typically at least 100 degrees higher than the flash point of the organic liquid solvent alone. In most of the cases, either the flash point is higher than 200° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Still another preferred embodiment of the present invention is a rechargeable lithium-sulfur cell or lithium-ion sulfur cell containing a sulfur cathode having sulfur or lithium polysulfide as a cathode active material.

For a lithium metal cell (where lithium metal is the primary active anode material), the anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof. The lithiophilic metal is preferably selected from Au, Ag, Mg, Zn, Ti, K, Al, Fe, Mn, Co, Ni, Sn, V, Cr, an alloy thereof, or a combination thereof.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The separator may comprise the presently disclosed electrolyte. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte may serve as the matrix material or binder material that helps to hold these fibers together. The separator may contain particles of a glass or ceramic material (e.g. metal oxide, metal carbide, metal nitride, metal boride, etc.).

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The present disclosure also provides an electrolyte composition comprising a lithium salt and an initiator or a crosslinking agent dissolved or dispersed in a reactive liquid medium comprising a reactive monomer or oligomer for a polyester of phosphoric acid. The electrolyte composition may further comprise a non-aqueous liquid solvent.

In certain preferred embodiments, the electrolyte composition comprises: (a) a first solution, comprising the reactive monomer or oligomer which is in a liquid state or is dissolved in a first non-aqueous liquid solvent; and (b) a second solution, comprising an initiator or crosslinking agent, a lithium salt, and a second non-aqueous liquid solvent; wherein the first solution and the second solution are stored separately before the first solution and the second solution are mixed to form an electrolyte.

The monomer is preferably selected from the group consisting of 2-alkoxy (or phenoxy)-2-oxo-1,3,2-dioxaphospholane (I) and 2-alkoxy (or phenoxy)-2-oxo-1,3,2-dioxaphosphorinane (II), derivatives thereof, and combinations thereof:

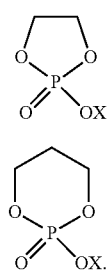

X = Alkyl; Aryl

The first non-aqueous liquid solvent may be the same as or different than the second non-aqueous liquid solvent. Either liquid solvent may be is selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone ($\gamma$-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), an ionic liquid solvent, or a combination thereof.

The lithium salt in the electrolyte composition may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof. The lithium salt in this list can also serve as an initiator, which is a highly surprising discovery.

The initiator is selected from n-$C_4H_9Li$, $(C_5H_5)_2Mg$, (i-$C_4H_9)_3Al$, a carbenium salt, $CF_3SO_3CH_3$, $CF_3SO_3C_2H_5$, $(CF_3SO_2)O$, $Ph_3C^+AsF_6^-$, a lithium salt, or a combination thereof. These initiators may or may not be used in combination with a lithium salt. The lithium salt may be selected from the list in the foregoing paragraph. Other types of lithium salts may also be used.

In certain embodiments, the initiator is selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof. These initiators may or may not be used in combination with a lithium salt.

The disclosure also provides an electrolyte composition comprising a non-aqueous liquid solvent, a lithium salt, and a reactive monomer dissolved in the liquid solvent, wherein there is no additional initiator (such as those initiators in the above two paragraphs) is added in the liquid solvent and wherein the reactive monomer is selected from the group consisting of 2-alkoxy (or phenoxy)-2-oxo-1,3,2-dioxaphospholane (I) and 2-alkoxy (or phenoxy)-2-oxo-1,3,2-dioxaphosphorinane (II), derivatives thereof, and combinations thereof:

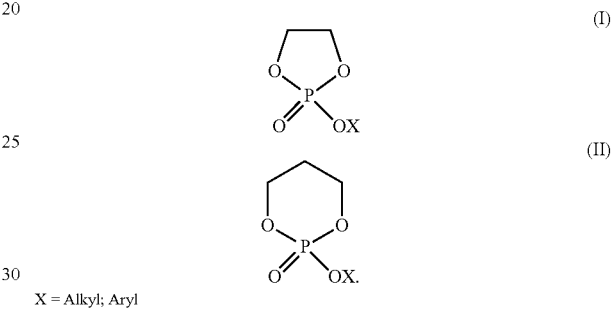

X = Alkyl; Aryl

In this electrolyte composition, the non-aqueous liquid solvent is preferably selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone ($\gamma$-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), an ionic liquid solvent, or a combination thereof.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The present disclosure also provides a method of producing the disclosed rechargeable lithium cell, the method comprising: (a) Combining an anode, an optional separator layer, a cathode, and a protective housing to form a cell; (b)

Introducing a reactive liquid electrolyte composition into the cell, wherein the reactive liquid electrolyte composition comprises at least a reactive monomer or oligomer, an optional non-aqueous liquid solvent, a lithium salt dissolved in the reactive monomer or oligomer or dissolved in the liquid solvent, a crosslinking agent and/or an initiator and wherein the monomer or oligomer is a precursor to a polyester of phosphoric acid (e.g. monomer or oligomer may be selected from the group consisting of phosphates, phosphoric acids, phosphites, phosphonates, phosphazenes, derivatives thereof, and combinations thereof); and (c) Partially or totally polymerizing the monomer or oligomer to obtain a quasi-solid or solid-state electrolyte wherein at least 30% by weight of the monomer or oligomer is polymerized.

In this method, the reactive liquid electrolyte composition may further comprise a second liquid solvent and step (c) either does not polymerize the second liquid solvent or polymerizes the second liquid solvent to a different extent as compared to the monomer or oligomer.

The disclosure further provides a method of producing the rechargeable lithium cell, the method comprising: (A) Mixing particles of a cathode active material, an optional conductive additive, an optional binder, and a reactive electrolyte composition to form a cathode, wherein the reactive electrolyte composition comprises a lithium salt and an initiator or a crosslinking agent dissolved or dispersed in a reactive liquid medium comprising a reactive monomer or oligomer for a polyester of phosphoric acid; (B) providing an anode; (C) combining the cathode and the anode to form a cell; and (D) partially or totally polymerizing the monomer or oligomer, prior to or after step (C), to produce the rechargeable lithium cell, wherein at least 30% by weight of the monomer or oligomer is polymerized.

In this method, the anode may be prepared in a similar manner, wherein step (B) may comprise a procedure of mixing particles of an anode active material, an optional conductive additive, an optional binder, a reactive additive, and a lithium salt to form an anode, wherein the reactive additive comprises at least a polymerizable liquid solvent and a crosslinking agent or initiator and wherein the method further comprises polymerizing and/or crosslinking the monomer or oligomer, prior to or after step (C), to produce the rechargeable lithium cell.

In the method, step (A) may further comprise adding particles of an inorganic solid electrolyte powder in the cathode or in the anode.

After step (D), one may choose to conduct a step (E) of injecting a second liquid solvent into the cell. This second liquid solvent may be polymerizable or non-polymerizable.

The disclosure provides yet another method of producing a rechargeable lithium cell, the method comprising: (A) combining an anode, an optional separator layer, a cathode, and a protective housing to form a cell; (B) introducing a reactive electrolyte liquid composition into the anode, the cathode or substantially the entire cell, wherein the electrolyte composition comprises a lithium salt and an initiator or a crosslinking agent dissolved or dispersed in a reactive liquid medium comprising a reactive monomer or oligomer for a polyester of phosphoric acid, and a non-aqueous liquid solvent; and (C) partially or totally polymerizing and/or crosslinking the liquid electrolyte composition to produce the rechargeable lithium cell, wherein the monomer or oligomer and the liquid solvent are polymerized or crosslinked to different extents.

The procedure of polymerizing and/or crosslinking may comprise exposing the reactive additive to heat, UV, high-energy radiation, or a combination thereof. The high-energy radiation may be selected from electron beam, Gamma radiation, X-ray, neutron radiation, etc. Electron beam irradiation is particularly useful.

These and other advantages and features of the present invention will become more transparent with the description of the following best mode practice and illustrative examples.

DETAILED DESCRIPTION

Figure 1A:
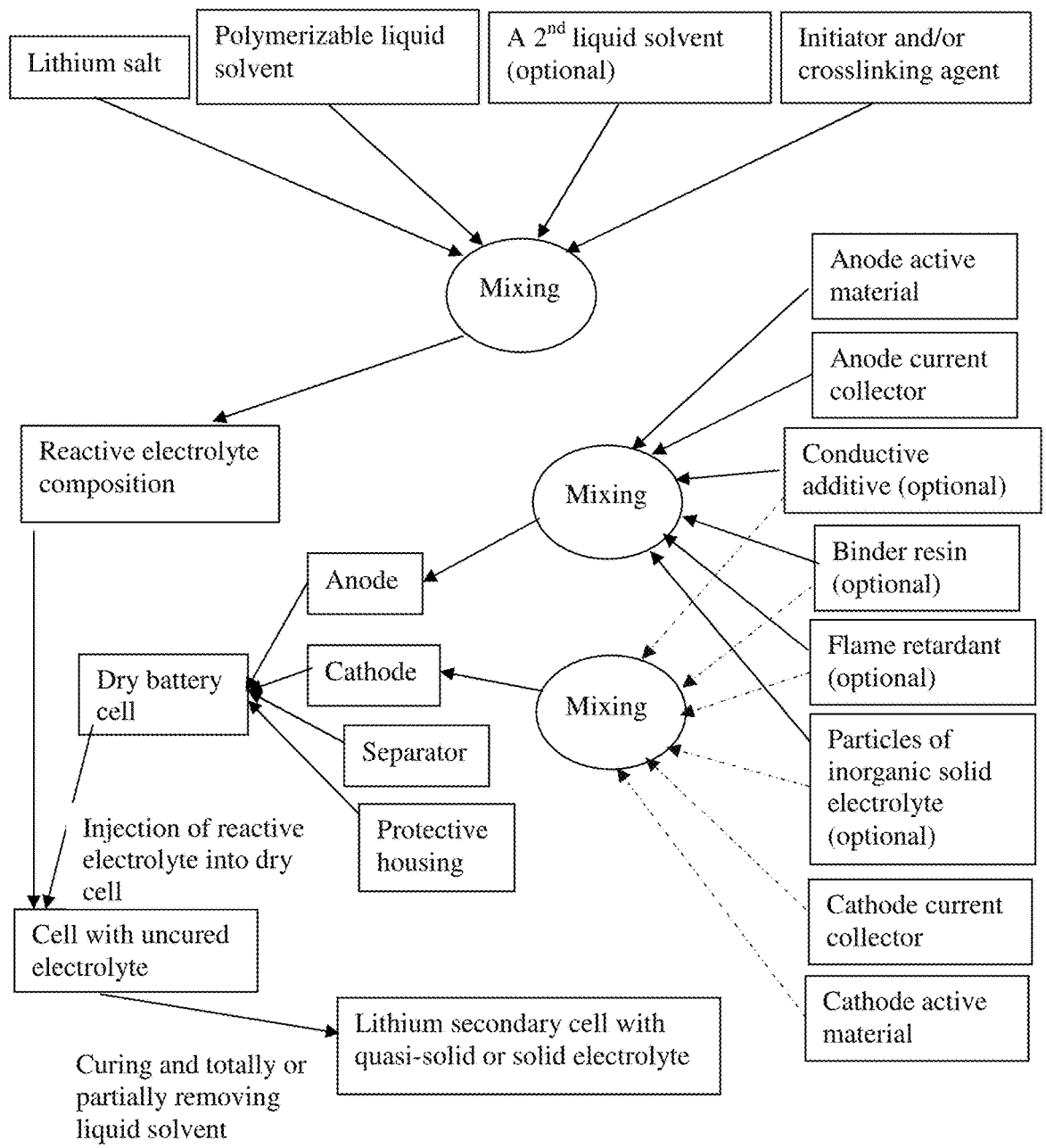
FIG. 1(A) A process flow chart to illustrate a method of producing a lithium metal battery comprising a substantially solid-state electrolyte according to some embodiments of the present disclosure.

The present invention provides a safe and high-performing lithium battery, which can be any of various types of lithium-ion cells or lithium metal cells. A high degree of safety is imparted to this battery by a novel and unique electrolyte that is highly flame-resistant and would not initiate a fire or sustain a fire and, hence, would not pose explosion danger. This invention has solved the very most critical issue that has plagued the lithium-metal and lithium-ion industries for more than two decades.

As indicated earlier in the Background section, a strong need exists for a safe, non-flammable, yet injectable quasi-solid electrolyte (or practically solid-state electrolyte) system for a rechargeable lithium cell that is compatible with existing battery production facilities. It is well-known in the art that solid-state electrolyte battery typically cannot be produced using existing lithium-ion battery production equipment or processes.

The present disclosure provides a rechargeable lithium battery comprising an anode, a cathode, and a quasi-solid or solid-state electrolyte in ionic communication with the anode and the cathode, wherein the electrolyte comprises a polymer comprising chains of a polyester of phosphoric acid and a lithium salt dissolved or dispersed in the polyester of phosphoric acid, represented by the following structure (Chemical formula 1 or formula 2):

(Chemical formula 1)

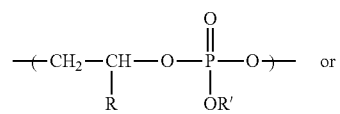

-continued (Chemical formula 2)

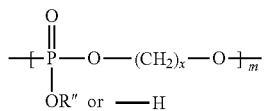

wherein (i) 3≤x≤10, R is selected from Li, H, a methyl, ethyl, propyl, vinyl, allyl, acrylate, alkyl, aryl, or CH$_2$Cl, and R' or R" is independently selected from Li, CH$_3$, C$_2$H$_5$, n-C$_3$H$_7$, i-C$_3$H$_7$; n-C$_4$H$_9$, CCl$_3$CH$_2$, C$_6$H$_5$, —OH, —COOH, —O—CH$_2$CH$_2$—R'", an alkyl, or an aryl, where R'"=—(CH$_2$)$_y$CH$_3$ and 0≤y≤10; or (ii) x=2, R is selected from Li, H, a methyl, ethyl, propyl, vinyl, allyl, acrylate, alkyl, aryl, or CH$_2$Cl, and R' or R" is independently selected from CH$_3$, C$_2$H$_5$, n-C$_3$H$_7$, i-C$_3$H$_7$; n-C$_4$H$_9$, CCl$_3$CH$_2$, C$_6$H$_5$, —OH, —COOH, an alkyl, or an aryl, vinyl, allyl, or acrylate; and wherein the lithium salt occupies a weight fraction from 0.1% to 50% based on the total weight of the lithium salt and the polyester of phosphoric acid combined.

The monomers for the preparation of polyester of phosphoric acid include the two cyclic phosphate esters—phospholanes (I) and phosphorinanes (II)—five- and six-membered cyclic compounds, respectively, and their derivatives. According to the UPAC nomenclature, the names of these compounds are 2-alkoxy (or phenoxy)-2-oxo-1,3,2-dioxaphospholane (I) and 2-alkoxy (or phenoxy)-2-oxo-1,3,2-dioxaphosphorinane (II).

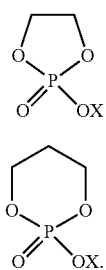

X = Alkyl; Aryl

In certain preferred embodiments, the lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoromethanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The electrolyte may further comprise from 0.1% to 50% (preferably 1%-30%) by weight of a non-aqueous liquid solvent dispersed in the polyester of phosphoric acid by weight, based on the total weight of the lithium salt, the polyester of phosphoric acid, and the non-aqueous liquid solvent combined.

The liquid solvent may be selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), an ionic liquid solvent, or a combination thereof.

It is uniquely advantageous to be able to polymerize the liquid monomer or oligomer once injected into a battery cell. With such a novel strategy, one can readily entrap the liquid solvent (if any) in the matrix of polymer chains or completely eliminate the liquid solvent all together. This approach also eliminates the problems of solid-state electrolyte's inability to wet the surfaces of electrode active materials and the challenges of incorporating a solid electrolyte into the battery once the polymer is fully polymerized. A liquid monomer or oligomer, or a solution containing the monomer or oligomer dissolved therein acts to wet the anode active material or cathode active material before the monomer/oligomer is polymerized or solvent is removed. This is of significant utility value since most of the organic solvents are known to be volatile and flammable, posing a fire and explosion danger.

Upon polymerization and/or crosslinking, the electrolyte is a quasi-solid or substantially solid-state electrolyte that has the following highly desirable and advantageous features: (i) good electrolyte-electrode contact and interfacial stability (minimal solid electrode-electrolyte interfacial impedance) commonly enjoyed by a liquid electrolyte but not by a conventional solid-state electrolyte; (ii) good processibility and ease of battery cell production; (iii) highly resistant to flame and fire.

The polymer preferably comprises a polymer having a lithium ion conductivity typically from $10^{-8}$ S/cm to $10^{-2}$ S/cm at room temperature.

In certain embodiments, the rechargeable lithium cell comprises:

(a) a cathode having a cathode active material (along with an optional conductive additive and an optional resin binder) and an optional cathode current collector (such as Al foil) supporting the cathode active material;

(b) an anode having an anode current collector, with or without an anode active material supported on the anode current collector; (It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" lithium cell.)

(c) an optional porous separator (a lithium ion-permeable membrane) electronically separating the anode and the cathode; and (d) an electrolyte, comprising a polymer comprising chains of a polyester of phosphoric acid and a lithium salt dissolved or dispersed in the polyester of phosphoric acid.

In some preferred embodiments, the battery cell contains substantially no liquid solvent therein after polymerization. However, it is essential to initially include a liquid monomer, liquid oligomer, or liquid solvent in the cell (which has the monomer or oligomer dissolved therein), enabling the lithium salt to get dissociated into lithium ions and anions. A majority (>50%, preferably >70%) or substantially all of the liquid solvent (particularly the organic solvent) is then removed just before or after curing of the monomer or oligomer. With substantially 0% liquid solvent, the resulting electrolyte is a solid-state electrolyte. With less than 30% liquid solvent, we have a quasi-solid electrolyte. Both are highly flame-resistant.

The presence of this liquid solvent is designed to impart certain desired properties to the polymerized electrolyte, such as lithium ion conductivity, flame retardancy, ability of the electrolyte to permeate into the electrode (anode and/or cathode) to properly wet the surfaces of the anode active material and/or the cathode active material.

Desirable liquid solvents (preferably having a melting point lower than 100° C., more preferably lower than 50° C., and most preferably lower than 25° C.) include fluorinated solvents; e.g., fluorinated vinyl carbonates, fluorinated esters, fluorinated vinyl esters, and fluorinated vinyl ethers. Fluorinated vinyl esters include $R_fCO_2CH=CH_2$ and Propenyl Ketones, $R_fCOCH=CHCH_3$, where $R_f$ is F or any F-containing functional group (e.g., $CF_2$— and $CF_2CF_3$—).

Two examples of fluorinated vinyl carbonates are given below:

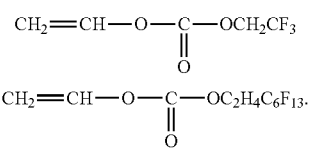

In some embodiments, the fluorinated carbonate is selected from fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

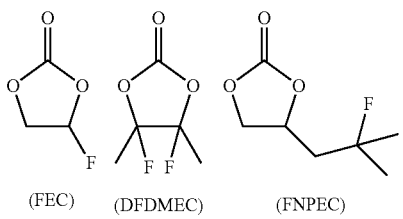

Desirable sulfones as a liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

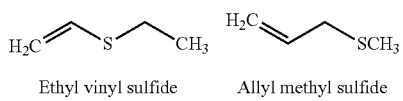

Ethyl vinyl sulfide     Allyl methyl sulfide

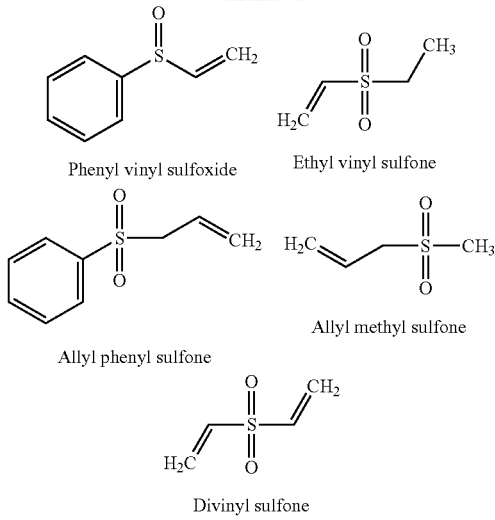

Phenyl vinyl sulfoxide    Ethyl vinyl sulfone

Allyl phenyl sulfone    Allyl methyl sulfone

Divinyl sulfone

In certain embodiments, the sulfone as a liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

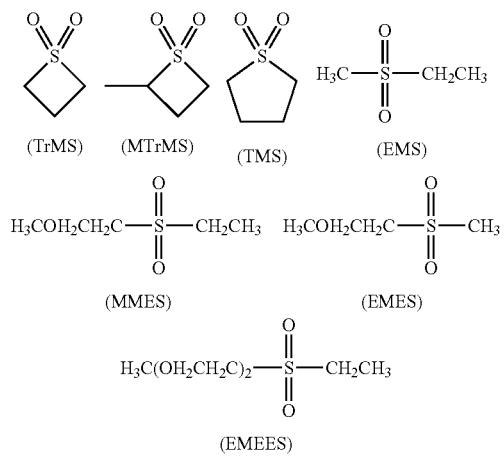

(TrMS)   (MTrMS)   (TMS)   (EMS)

(MMES)       (EMES)

(EMEES)

The nitrile as a liquid solvent or as an additive to a liquid solvent may be selected from a dinitrile, such as AND, GLN, SEN, or a combination thereof and their chemical formulae are given below:

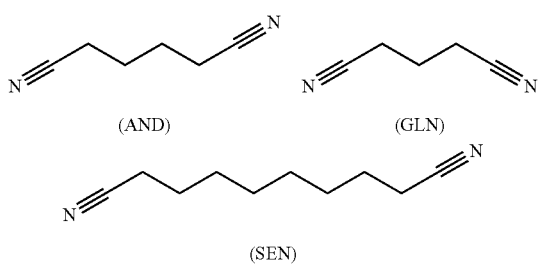

(AND)         (GLN)

(SEN)

In some embodiments, the liquid solvent is selected from phosphate, alkyl phosphonate, phosphazene, phosphite, or sulfate; e.g., tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

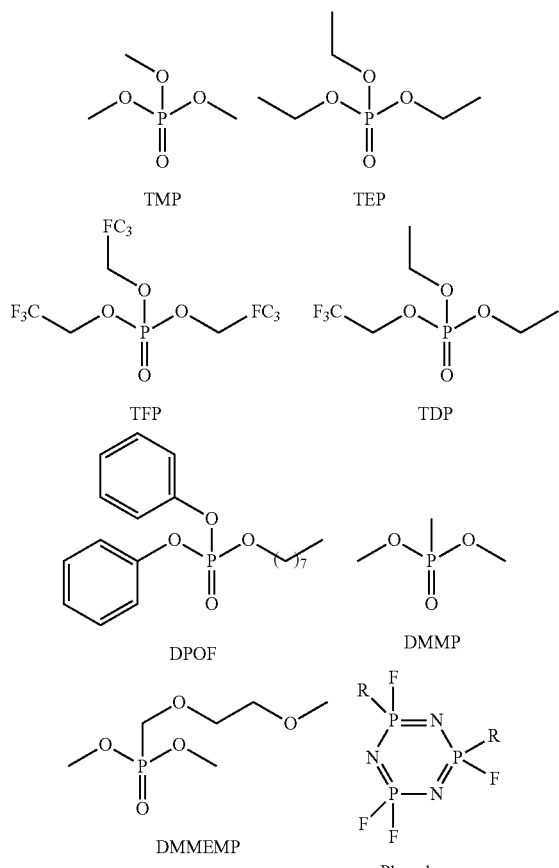

wherein R=H, NH$_2$, or C$_1$-C$_6$ alkyl.

Phosphonate moieties can be readily introduced into vinyl monomers to produce allyl-type, vinyl-type, styrenic-type and (meth)acrylic-type liquid solvents bearing phosphonate groups (e.g., either mono or bisphosphonate). Examples include diethyl vinylphosphonate, dimethyl vinylphosphonate, vinylphosphonic acid, diethyl allyl phosphate, and diethyl allylphosphonate:

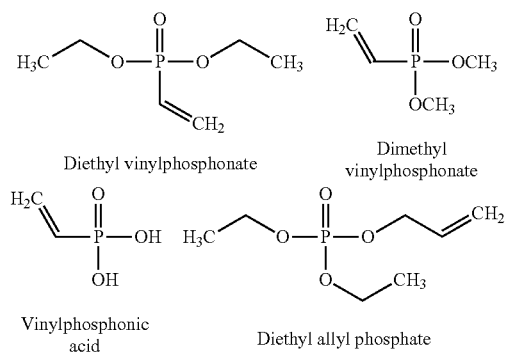

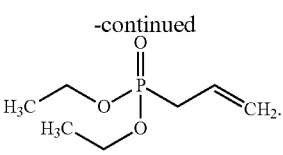

Diethyl allylphosphonate

The siloxane or silane as a liquid solvent may be selected from alkylsiloxane (Si—O), alkyylsilane (Si—C), liquid oligomeric silaxane (—Si—O—Si—), or a combination thereof.

Representative monomers for the preparation of a polyester of phosphoric acid include 2-Alk(aryl)oxy-2-oxo-1,3, 2-dioxaphospholans:

(Chemical formula 3)

wherein R is selected from Li, H, a methyl, ethyl, propyl, vinyl, allyl, acrylate, alkyl, aryl, or CH$_2$Cl, and R' is selected from Li, CH$_3$, C$_2$H$_5$, n-C$_3$H$_7$, i-C$_3$H$_7$; n-C$_4$H$_9$, CCl$_3$CH$_2$, C$_6$H$_5$, —OH, —COOH, —O—CH$_2$CH$_2$—R''', alkyl, aryl, where R'''=—(CH$_2$)$_y$CH$_3$ and 0≤y≤10.

The initiators for anionic or bulk polymerization of these monomers may be selected from n-C$_4$H$_9$Li, (C$_5$H$_5$)$_2$Mg, or (i-C$_4$H$_9$)$_3$Al, carbenium salts, and certain lithium salts. The reactions may be conducted at a temperature from −60° C. to 30° C., leading to high molecular weights, typically from 3×10$^3$ to 10$^5$. Cationic polymerization may be initiated with CF$_3$SO$_3$CH$_3$, CF$_3$SO$_3$C$_2$H$_5$, (CF$_3$SO$_2$)O, Ph$_3$C$^+$AsF$_6^-$, and certain other lithium salts, leading to colored, oily products with number average molecular weights typically up to 10$^3$.

The disclosed electrolyte may be initially in a reactive liquid electrolyte composition form, comprising a lithium salt and an initiator or a crosslinking agent dissolved or dispersed in a reactive liquid medium comprising a reactive monomer or oligomer for a polyester of phosphoric acid.

In certain preferred embodiments, the electrolyte composition comprises: (a) a first solution, comprising the reactive monomer or oligomer which is in a liquid state or is dissolved in a first non-aqueous liquid solvent; and (b) a second solution, comprising an initiator or crosslinking agent, a lithium salt, and a second non-aqueous liquid solvent; wherein the first solution and the second solution are stored separately before the first solution and the second solution are mixed to form an electrolyte. The first non-aqueous liquid solvent may be the same as or different than the second non-aqueous liquid solvent.

The reactive liquid electrolyte composition may further comprise a curing agent (a crosslinking agent or co-polymerization species) selected from an amide group, such as N,N-dimethylacetamide N,N-diethylacetamide, N,N-dimethylformamide, N,N-diethylformamide, or a combination thereof. The crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule. In certain embodiments, the crosslinking agent is selected from poly(diethanol) diacrylate, poly(ethyleneglycol)dimethacrylate, poly(diethanol) dimethylacrylate, or poly(ethylene glycol) diacrylate.

The initiator may be selected from n-$C_4H_9Li$, $(C_5H_5)_2Mg$, $(i-C_4H_9)_3Al$, a carbenium salt, $CF_3SO_3CH_3$, $CF_3SO_3C_2H_5$, $(CF_3SO_2)O$, $Ph_3C^+AsF_6^-$, a lithium salt, or a combination thereof.

The initiator may comprise a lithium salt selected from lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium oxalyldifluoroborate ($LiBF_2C_2O_4$), or a combination thereof. In other words, we have surprisingly observed that certain lithium salts actually participate in the polymerization reactions.

The initiator or a co-initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

The crosslinking agent preferably comprises a compound having at least one reactive group selected from a hydroxyl group, an amino group, an imino group, an amide group, an amine group, an acrylic group, or a mercapto group in the molecule. The amine group is preferably selected from Chemical Formula 4:

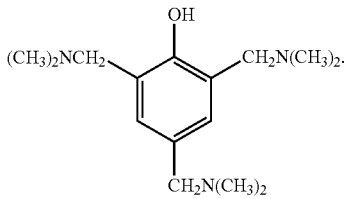

(Chemical Formula 4)

The crosslinking agent is preferably selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g. polyhydroxyethylmethacrylate), glycidyl functions, N,N'-Methylenebisacrylamide (MBAAm), Ethylene glycol dimethacrylate (EGDMAAm), isobornyl methacrylate, poly(acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

The electrolyte may further comprise a flame-retardant additive, different in composition than the liquid solvent. Flame-retardant additives are intended to inhibit or stop polymer pyrolysis and electrolyte combustion processes by interfering with the various mechanisms involved—heating, ignition, and propagation of thermal degradation.

The flame-retardant additive may be selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

There is no limitation on the type of flame retardant that can be physically or chemically incorporated into the elastic polymer. The main families of flame retardants are based on compounds containing: Halogens (Bromine and Chlorine), Phosphorus, Nitrogen, Intumescent Systems, Minerals (based on aluminum and magnesium), and others (e.g., Borax, $Sb_2O_3$, and nanocomposites). Antimony trioxide is a good choice, but other forms of antimony such as the pentoxide and sodium antimonate may also be used.

One may use the reactive types (being chemically bonded to or becoming part of the polymer structure) and additive types (simply dispersed in the polymer matrix). For instance, reactive polysiloxane can chemically react with EPDM type elastic polymer and become part of the crosslinked network polymer. It may be noted that flame-retarding group modified polysiloxane itself is an elastic polymer composite containing a flame retardant according to an embodiment of instant disclosure. Both reactive and additive types of flame retardants can be further separated into several different classes:

1) Minerals: Examples include aluminum hydroxide (ATH), magnesium hydroxide (MDH), huntite and hydromagnesite, various hydrates, red phosphorus and boron compounds (e.g. borates).
2) Organo-halogen compounds: This class includes organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCGs), brominated epoxy oligomers (BEOs), tetrabromophthalic anyhydride, tetrabromobisphenol A (TBBPA), and hexabromocyclododecane (HBCD).
3) Organophosphorus compounds: This class includes organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminum diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis(2-chlorethyl) dichloroisopentyldiphosphate (V6).
4) Organic compounds such as carboxylic acid and dicarboxylic acid The mineral flame retardants mainly act as additive flame retardants and do not become chemically attached to the surrounding system (the polymer). Most of the organohalogen and organophosphate compounds also do not react permanently to attach themselves into the polymer. Certain new non halogenated products, with reactive and non-emissive characteristics have been commercially available as well.

In certain embodiments, the flame-retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material. The encapsulating or micro-droplet formation processes The flame-retardant additive-to-liquid solvent ratio in the mixture is from 1/95 to 99/1 by weight, preferably from 10/85 to 80/20 by weight, further preferably from 20/80 to 70/20 by weight, and most preferably from 35/65 to 65/35 by weight.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolytes that can be incorporated into an elastic polymer protective layer include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium--ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)$; is very low, but can be improved by the substitution of Hf or Sn. This can be further enhanced with substitution to form $Li_{1+x}M_xTi_{2-x}(PO_2)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02\times10^{-3}$ S/cm at room temperature.

The sulfide-type solid electrolytes include the $Li_2S$—$SiS_2$ system. The highest reported conductivity in this type of material is $6.9\times10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an electrolyte polymer can help enhance the lithium ion conductivity of certain polymers having an intrinsically low ion conductivity.

Preferably and typically, the polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm.

The disclosed lithium battery can be a lithium-ion battery or a lithium metal battery, the latter having lithium metal as the primary anode active material. The lithium metal battery can have lithium metal implemented at the anode when the cell is made. Alternatively, the lithium may be stored in the cathode active material and the anode side is lithium metal-free initially. This is called an anode-less lithium metal battery.

Figure 2A:
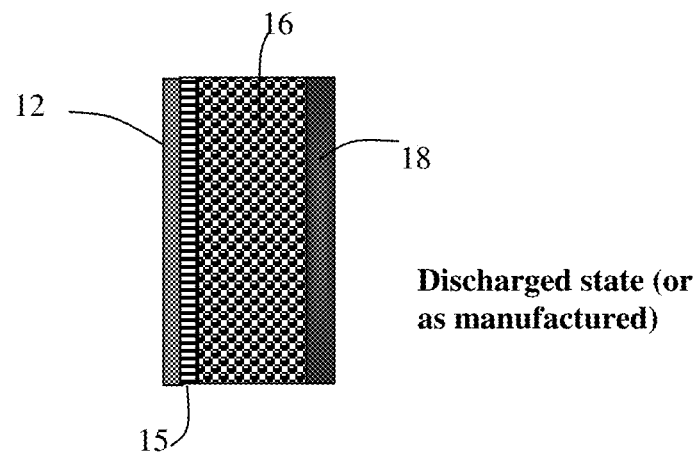
FIG. 2(A) Structure of an anode-less lithium metal cell (as manufactured or in a discharged state) according to some embodiments of the present disclosure.

As illustrated in FIG. 2(A), the anode-less lithium cell is in an as-manufactured or fully discharged state according to certain embodiments of the present disclosure. The cell comprises an anode current collector 12 (e.g., Cu foil), a separator, a cathode layer 16 comprising a cathode active material, an optional conductive additive (not shown), an optional resin binder (not shown), and an electrolyte (dispersed in the entire cathode layer and in contact with the cathode active material), and a cathode current collector 18 that supports the cathode layer 16. There is no lithium metal in the anode side when the cell is manufactured.

Figure 2B:
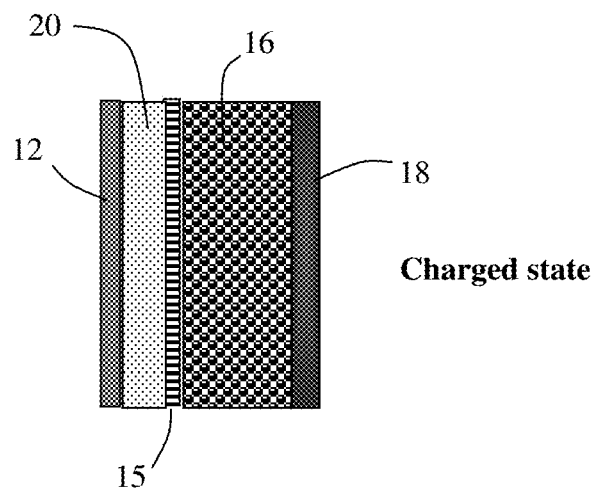
FIG. 2(B) Structure of an anode-less lithium metal cell (in a charged state) according to some embodiments of the present disclosure.

In a charged state, as illustrated in FIG. 2(B), the cell comprises an anode current collector 12, lithium metal 20 plated on a surface (or two surfaces) of the anode current collector 12 (e.g., Cu foil), a separator 15, a cathode layer 16, and a cathode current collector 18 supporting the cathode layer. The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a surface or both surfaces of an anode current collector.

One unique feature of the presently disclosed anode-less lithium cell is the notion that there is substantially no anode active material and no lithium metal is present when the battery cell is made. The commonly used anode active material, such as an intercalation type anode material (e.g., graphite, carbon particles, Si, SiO, Sn, $SnO_2$, Ge, etc.), P, or any conversion-type anode material, is not included in the cell. The anode only contains a current collector or a protected current collector. No lithium metal (e.g., Li particle, surface-stabilized Li particle, Li foil, Li chip, etc.) is present in the anode when the cell is made; lithium is basically stored in the cathode (e.g., Li element in $LiCoO_2$, $LiMn_2O_4$, lithium iron phosphate, lithium polysulfides, lithium polyselenides, etc.). During the first charge procedure after the cell is sealed in a housing (e.g., a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g., Li metal foil and particles) is highly sensitive to air moisture and oxygen and notoriously known for its difficulty and danger to handle during manufacturing of a Li metal cell. The manufacturing facilities should be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 m$^2$/g (more preferably from 10 to 500 m$^2$/g).

For a lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

Another surprising and of tremendous scientific and technological significance is our discovery that the flammability of any volatile organic solvent can be effectively suppressed provided that a sufficiently high amount of a lithium salt and polymer is added to and dissolved in this organic solvent to form a solid-like or quasi-solid electrolyte (e.g., first electrolyte in the cathode). In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any lithium salt dissolved therein, are typically significantly higher.) In many cases, the vapor molecules are practically too few to be detected.

A highly significant observation is that the polymer derived (polymerized) from an otherwise volatile solvent (monomer) can dramatically curtail the amount of volatile solvent molecules that can escape into the vapor phase in a thermodynamic equilibrium condition. In many cases, this has effectively prevented any flammable gas molecules from initiating a flame even at an extremely high temperature. The flash point of the quasi-solid or solid-state electrolyte is typically at least 100 degrees (often >150 degrees) higher than the flash point of the neat organic solvent without polymerization. In most of the cases, either the flash point is significantly higher than 200° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

In addition to the non-flammability and high lithium ion transference numbers, there are several additional benefits associated with using the presently disclosed quasi-solid or solid-state electrolytes. As one example, these electrolytes can significantly enhance cycling and safety performance of rechargeable lithium batteries through effective suppression of lithium dendrite growth. Due to a good contact between the electrolyte and an electrode, the interfacial impedance can be significantly reduced. Additionally, the local high viscosity induced by presence of a polymer can increase the pressure from the electrolyte to inhibit dendrite growth, potentially resulting in a more uniform deposition of lithium ions on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte and a crosslinked polymer is used, the solubility of lithium polysulfide will be reduced significantly.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl) imide, lithium bis(fluorosulphonyl)imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present invention. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

There is also no restriction on the type of the cathode materials that can be used in practicing the present disclosure. For Li—S cells, the cathode active material may contain lithium polysulfide or sulfur. If the cathode active material includes lithium-containing species (e.g., lithium polysulfide) when the cell is made, there is no need to have a lithium metal pre-implemented in the anode.

There are no particular restrictions on the types of cathode active materials that can be used in the presently disclosed lithium battery, which can be a primary battery or a secondary battery. The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. For those cathode active materials containing no Li element therein, there should be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_{1-p}$Co$_{1-p}$O$_2$, 0<p<1), or lithium nickel manganese oxide (LiNi$_q$Mn$_{2-q}$O$_4$, 0<q<2).

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there should be a lithium source implemented in the cathode side to begin with.

In another preferred rechargeable lithium cell (e.g. a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "C$_6$O$_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN) 6), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer may be selected from Poly[methanetetryl-tetra(thiomethylene)] (PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that include conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene] (PTKPTB) have a polyphenylene main chain, linking thiolane on benzene moieties as pendants. Similarly, poly[3,4 (ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there should be a lithium source implemented in the cathode side to begin with.

Figure 1B:
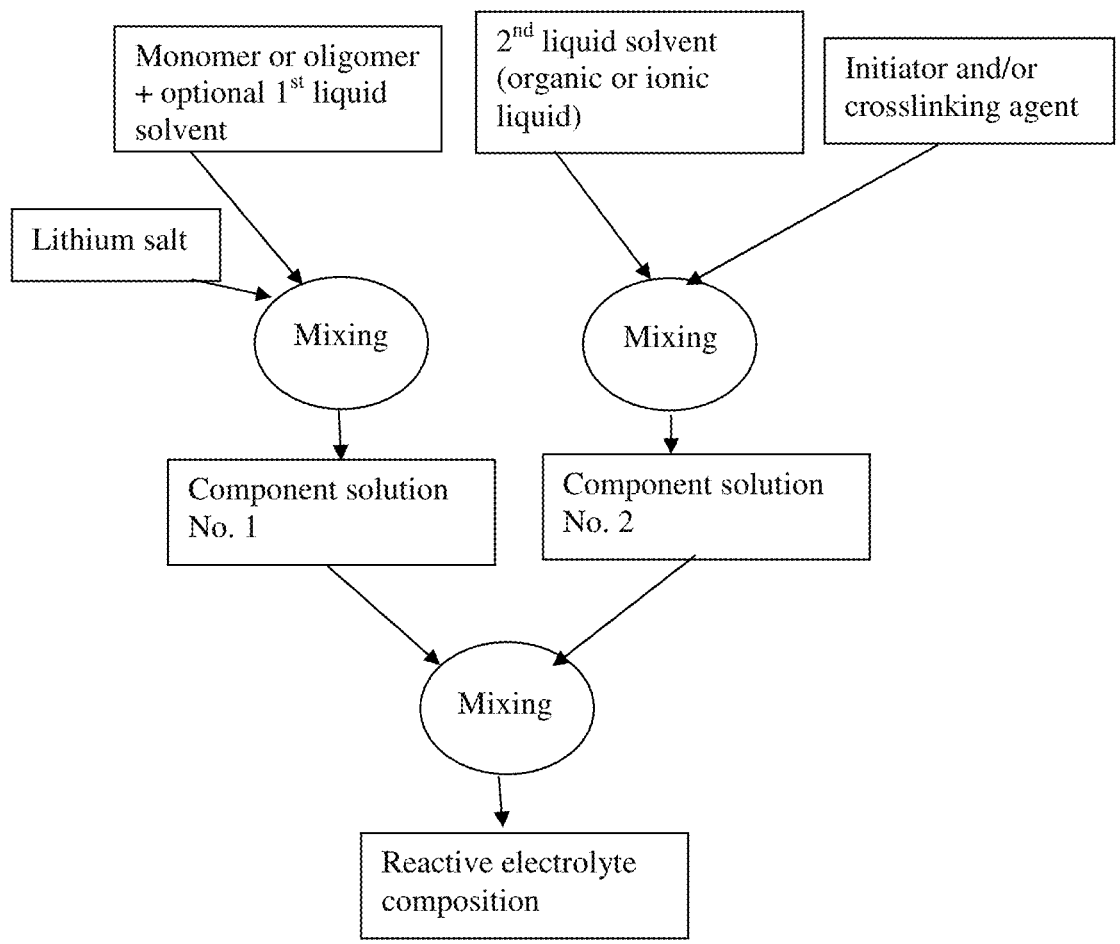
FIG. 1(B) A process flow chart to illustrate the method of producing a reactive electrolyte composition according to some embodiments of the present disclosure.

As illustrated in FIG. 1(B), the present disclosure also provides an electrolyte composition comprising: (a) a first solution, comprising at least a polymerizale liquid solvent; and (b) a second solution, comprising an initiator and/or crosslinking agent, a lithium salt, and a second non-aqueous liquid solvent (e.g., an organic solvent or ionic liquid solvent); wherein the first solution and the second solution are stored separately before the first solution and the second solution are mixed to form the electrolyte. Actually, the lithium salt may be dissolved in the first solvent, the second solvent, or both.

The disclosure further provides a method of producing a rechargeable lithium cell (as illustrated in FIG. 1(A)), the method comprising: (a) providing a cathode; (b) providing an anode; (c) combining the cathode and the anode to form a dry cell; and (d) introducing (e.g., injecting) the presently disclosed electrolyte composition into the dry cell and polymerizing and/or crosslinking the reactive additive to produce the rechargeable lithium cell. Step (d) may comprise partially or totally removing any un-polymerized liquid solvent.

In this method, step (a) may be selected from any commonly used cathode production process. For instance, the process may include (i) mixing particles of a cathode active material, a conductive additive, an optional resin binder, optional particles of a solid inorganic electrolyte powder, and an optional flame retardant in a liquid medium (e.g., an organic solvent, such as NMP) to form a slurry; and (ii) coating the slurry on a cathode current collector (e.g., an Al foil) and removing the solvent. The anode in step (b) may be produced in a similar manner, but using particles of an anode active material (e.g., particles of Si, SiO, Sn, SnO$_2$, graphite, and carbon). The liquid medium used in the production of an anode may be water or an organic solvent. Step (c) may entail combining the anode, a porous separator, the cathode, along with their respective current collectors, to form a unit cell which is enclosed in a protective housing to form a dry cell.

Figure 1C:
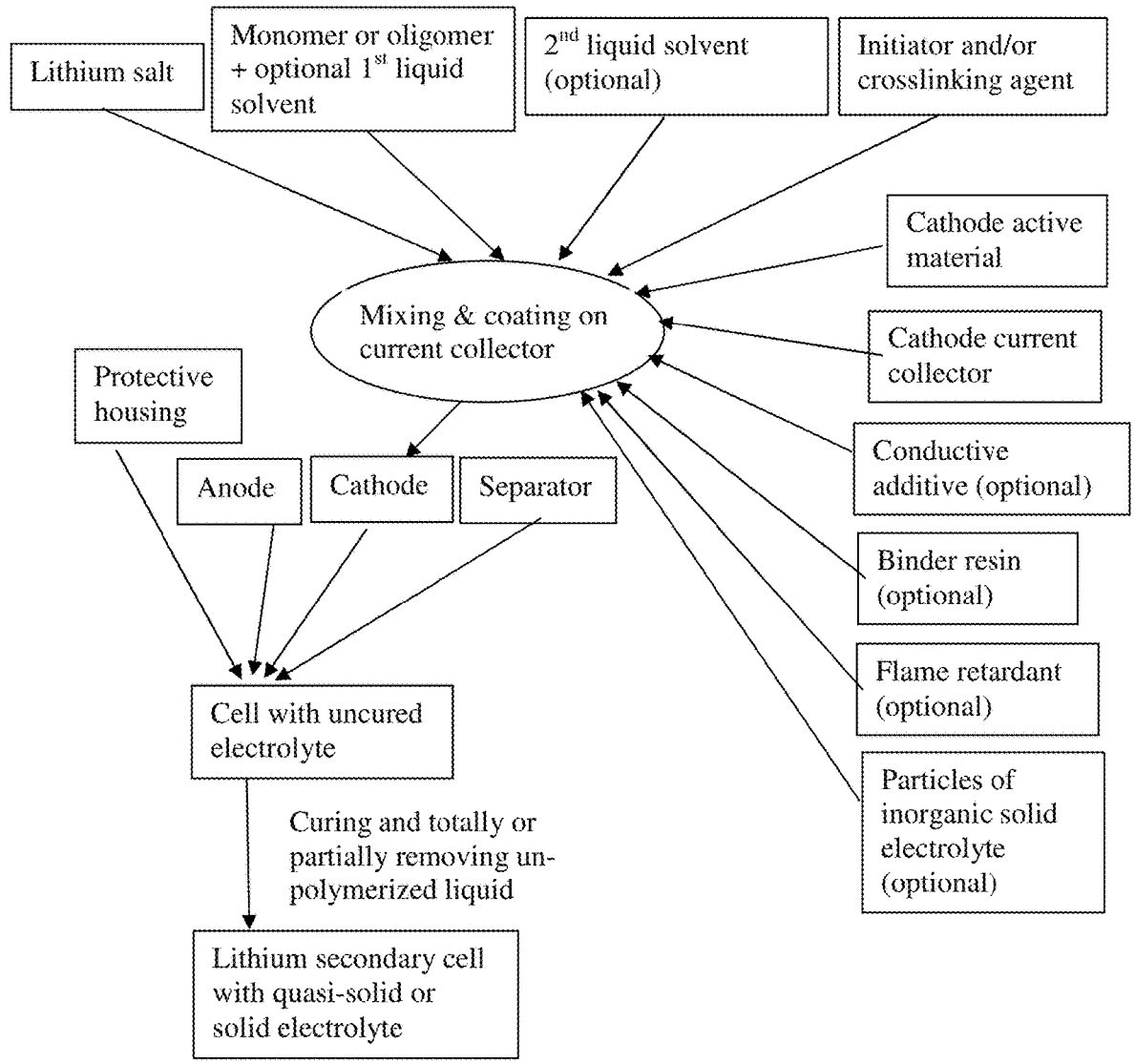
FIG. 1(C) A process flow chart to illustrate a method of producing a lithium metal battery comprising a substantially solid-state electrolyte according to some embodiments of the present disclosure.

As illustrated in FIG. 1(C), the disclosure also provides a method of producing the disclosed rechargeable lithium cell, the method comprising: (A) mixing particles of a cathode active material, an optional conductive additive (typically required in the cathode), an optional binder (optional but not required since, upon polymerization and/or crosslinking, the reactive additive becomes a binder that bonds the solid particles in the electrode together), an optional flame retardant, optional particles of an inorganic solid electrolyte powder, a reactive additive, and a lithium salt to form a cathode, wherein the reactive additive comprises at least one polymerizable solvent and a curing agent or initiator; (B) providing an anode; (C) combining the cathode and the anode to form a cell; and (D) polymerizing and/or crosslinking the reactive additive, prior to or after step (C), to produce the rechargeable lithium cell.

In step (A), particles of a cathode active material, an optional conductive additive, an optional binder, an optional flame retardant, a lithium salt, and optional particles of an inorganic solid electrolyte powder may be dissolved or dispersed in a reactive additive (containing at least a polymerizable liquid solvent) to form a slurry. The slurry is attached to or coated on a primary surface or both primary surfaces of a cathode current collector (e.g., Al foil) to form a cathode.

In certain embodiments, step (B) comprises a procedure of mixing particles of an anode active material, an optional conductive additive (not required if the anode active material is a carbon or graphite material), an optional binder (not required since, upon polymerization and/or crosslinking, the reactive additive becomes a binder that bonds the solid particles in the electrode together), an optional flame retardant, optional particles of an inorganic solid electrolyte powder, a reactive additive (the same or different reactive as used in the cathode, and a lithium salt to form an anode.

The method further comprises polymerizing and/or crosslinking the reactive additive, prior to or after step (C), to produce the rechargeable lithium cell.

In some embodiments, step (A) further comprises adding particles of an inorganic solid electrolyte powder in the cathode. Step (B) may further comprise adding particles of an inorganic solid electrolyte powder in the anode.

Figure 1D:
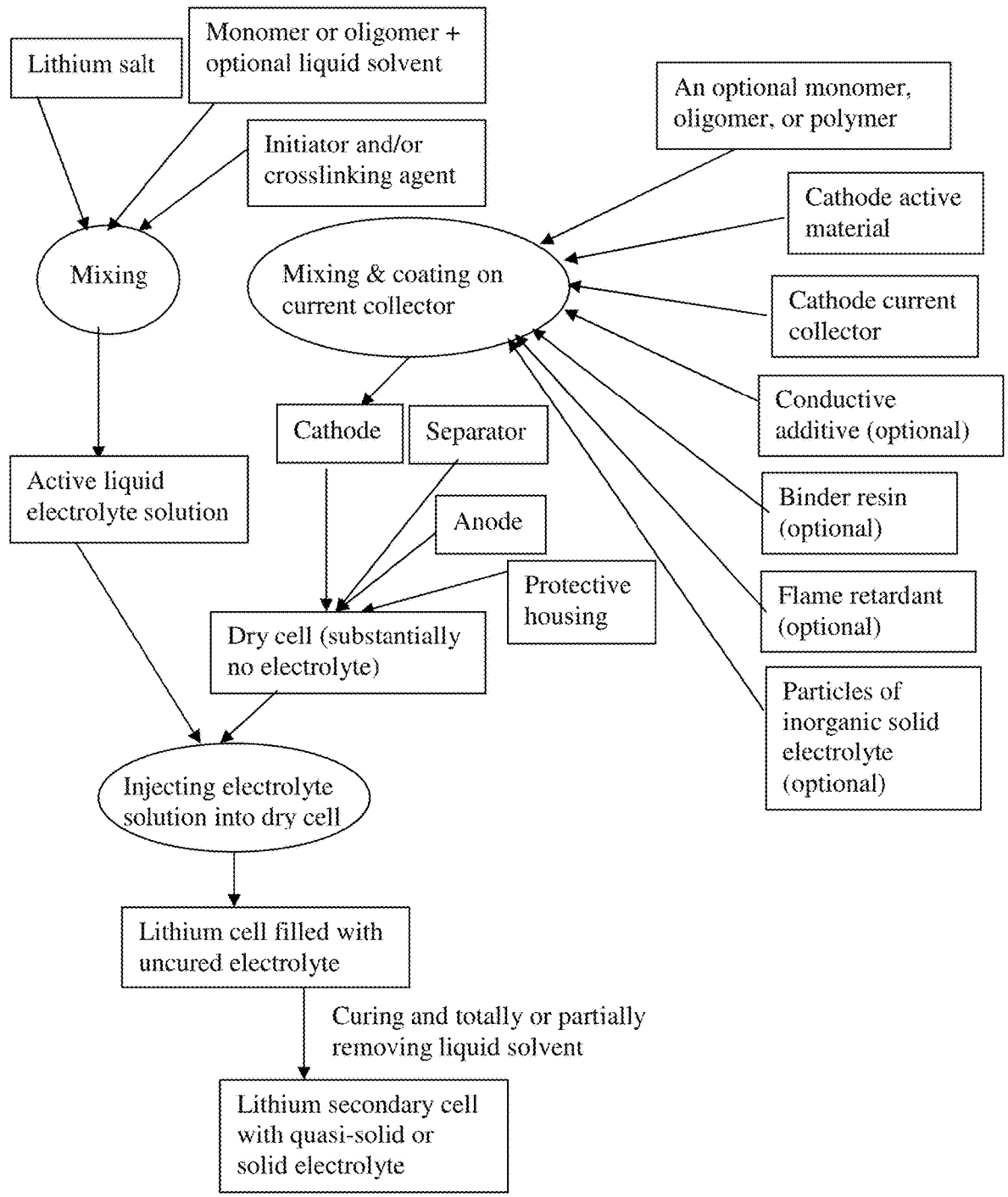
FIG. 1(D) A process flow chart to illustrate a method of producing a lithium metal battery comprising a substantially solid-state electrolyte according to some embodiments of the present disclosure.

Illustrated in FIG. 1(D) is yet another embodiment of the present disclosure, which is a method of producing the disclosed rechargeable lithium cell. The method comprises: (A) mixing particles of a cathode active material, an optional conductive additive (typically required in the cathode), an optional binder (not required since the reactive additive becomes a binder upon polymerization and/or crosslinking), an optional flame retardant, optional particles of an inorganic solid electrolyte powder, and a reactive additive to form a cathode (preferably containing at least one cathode active material layer supported on a current collector), wherein the reactive additive comprises at least one polymerizable liquid solvent; (B) providing an anode; (C) combining the cathode, an optional separator, the anode, and a protective housing to form a cell; and (D) injecting a liquid mixture of a lithium salt, an initiator or crosslinking agent, an optional flame retardant (if in a liquid state) and a second non-aqueous liquid solvent into the cell and polymerizing and/or crosslinking the reactive additive to produce the rechargeable lithium cell. This may be followed by a step of partially or totally removing any un-polymerized solvent.

For the production of a lithium-ion cell, step (B) may comprise mixing particles of an anode material (e.g., Si, SiO, graphite, carbon particles, etc.), an optional conductive additive, an optional binder, an optional flame retardant, optional particles of an inorganic solid electrolyte powder, and a reactive additive to form at least one anode active layer supported on an anode current collector (e.g., Cu foil).

The following examples are presented primarily for the purpose of illustrating the best mode practice of the present invention, not to be construed as limiting the scope of the present invention.

EXAMPLES 1a-1e

Solid State Electrolytes Via In Situ Curing of Cyclic Esters of Phosphoric Acid As selected examples of polymers from phosphates, five-membered cyclic esters of phosphoric acid of the general formula: —CH$_2$CH(R)OP(O)—(OR')O— were polymerized to solid, soluble polymers of high molecular weight by using n-C$_4$H$_9$Li, (C$_5$H$_5$)$_2$Mg, or (i-C$_4$H$_9$)$_3$Al as initiators. The resulting polymers have a repeating unit as follows:

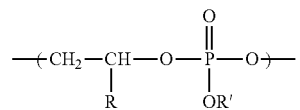

where R is H, with R'=CH$_3$, C$_2$H$_5$, n-C$_3$H$_7$, i-C$_3$H$_7$; n-C$_4$H$_9$, CCl$_3$CH$_2$, or C$_6$H$_5$, or R is CH$_2$Cl and R' is C$_2$H$_5$. The polymers typically have a number average molecular weight $M_n$=10$^4$–10$^5$ dalton.

In some samples, a desired amount (5% by weight based on a total electrode weight) of a flame retardant (e.g. decabromodiphenyl ethane (DBDPE), brominated poly(2,6-dimethyl-1,4-phenylene oxide) (BPPO), and melamine-based flame retardant, separately; the latter from Italmatch Chemicals) was added into the anode and/or the cathode prior to the electrolyte injection. They can be added into the reactive electrolyte compositions as well.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing quasi-solid or solid-state electrolytes obtained by in situ curing perform very well in terms of cycling stability and the energy storage capacity and yet these cells are flame resistant and relatively safe.

EXAMPLE 1a

In a representative procedure, initiators n-C$_4$H$_9$Li (0.5% by weight) and 5% lithium bis(oxalato)borate (LiBOB) as a lithium salt were mixed with 2-alkoxy-2-oxo-1,3,2-dioxaphospholan (R=H and R'=CH$_3$ in the following Chemical formula 3a):

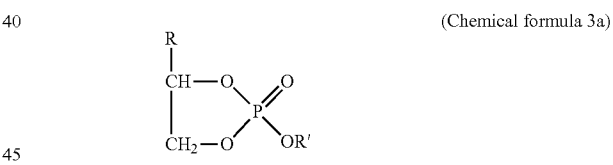

(Chemical formula 3a)

Temperature or a second solvent may be used to adjust the viscosity of the reactant mixture, where necessary. The reactive mixture was introduced into a battery cell and the anionic polymerization was allowed to proceed at 0° C. overnight to produce a solid state electrolyte in situ. Additionally, the reactive mixture was cast onto a glass surface and cured under comparable conditions. The room temperature lithium-ion conductivity of this solid electrolyte was approximately 2.1×10$^{-4}$ S/cm. The lithium-ion cells prepared in this example comprise an anode of meso-carbon micro-beads (MCMB, an artificial graphite), a cathode of NCM-622 particles, and a porous PE/PP membrane as a separator.

EXAMPLE 1b

In a representative procedure, initiators n-C$_4$H$_9$Li (0.5% by weight) and 5% lithium perchlorate (LiClO$_4$) as a lithium salt, dissolved in FEC, were mixed with 2-alkoxy-2-oxo-1,3,2-dioxaphospholan (R=H and R'=C$_2$H$_5$ in the above Chemical formula 3a). The mixture was introduced into a battery cell and the anionic polymerization was allowed to proceed at 25° C. overnight to produce a solid state electrolyte in situ. The room temperature lithium ion conductivities of this solid electrolyte was $8.9 \times 10^{-4}$ S/cm. The lithium-ion cells prepared in this example comprise an anode of graphene-protected Si particles, a cathode of NCM-622 particles, and a porous PE/PP membrane as a separator.

EXAMPLE 1c

In a representative procedure, initiators i-$(C_4H_9)_3$Al (0.5% by weight) and 8% lithium borofluoride ($LiBF_4$) as a lithium salt were mixed with 2-alkoxy-2-oxo-1,3,2-dioxaphospholan (R=H and R'=$CCl_3CH_2$ in the above Chemical formula 3a). The mixture was introduced into a battery cell and the anionic polymerization was allowed to proceed at 25° C. overnight to produce a solid state electrolyte in situ. The room temperature lithium ion conductivities of this solid electrolyte was $1.1 \times 10^{-4}$ S/cm. The battery cell was a lithium/NCM-532 cell (initially the cell being lithium-free). In several samples, a garnet-type solid electrolyte ($Li_7La_3Zr_2O_{12}$ (LLZO)) powder was added into the cathode (NCM-532) in the anode-less lithium battery.

EXAMPLE 1d

In a representative procedure, initiators i-$(C_4H_9)_3$Al (0.5% by weight) and 10% lithium hexafluorophosphate ($LiPF_6$) as a lithium salt were mixed with 2-alkoxy-2-oxo-1,3,2-dioxaphospholan (R is $CH_2Cl$ and R' is $C_2H_5$) in the above Chemical formula 3a). The mixture was introduced into a battery cell and the anionic polymerization was allowed to proceed at 0° C. overnight to produce a solid state electrolyte in situ. The room temperature lithium ion conductivities of this solid electrolyte was $7.5 \times 10^{-4}$ S/cm. The lithium-ion cell contains a Si-based anode and a NCM-532 cathode.

EXAMPLE 2

Solid State Electrolytes Via In Situ Curing of Cyclic Esters of Phosphoric Acid (alkyl-2-oxo-1,3,2-dioxaphosphorinanes)

As selected examples, alkyl-2-oxo-1,3,2-dioxaphosphorinanes were polymerized to solid polymers of polyesters of phosphoric acid by using alcoholate anions (e.g., $C_2H_5$ONa and $C_2H_5$OLi) as initiators. The resulting polymers have a repeating unit as follows:

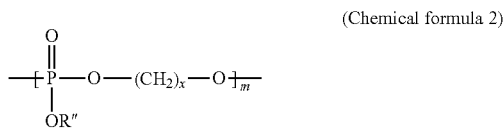

(Chemical formula 2)

where x>2 (x=3 in the samples as an example), with exocycic alkyl substituents R"=methyl, ethyl, n-propyl, trimethylsilyl, i-propyl, 1,1,1,-trifluoroethyl, and 1,1,1-trichloroethyl, etc.

Anionic polymerization can be initiated in bulk or in solution of diglyme or DMSO by $C_2H_5$ONa or $C_2H_5$OLi, in the temperature region 60-120° C.

Cationic polymerization in bulk of e.g., 2-methyl-2-oxo-1,3,2-dioxaphosphorinane, induced with an initiator bearing stable anion (like $AsF_6^-$, $PF_6^-$, or $CF_3SO_3^-$) proceeds quite fast above 100°. Thus, polymerization will be complete in a few hours, if the starting concentration of initiator is equal to $10^{-3}$–$10^{-2}$ mol/L.

Both Li metal cells (containing a lithium foil as an anode material) and Li-ion cells (containing artificial graphite particles as an anode active material) were prepared. Both cells comprise NCA particles as the cathode active material.

EXAMPLES 3-1 to 3-7

Solid State Electrolytes Via In Situ Polymerization of 2-hydro-2-oxo-1,3,2-dioxaphosphorinan A high molecular weight polymer having the structure of 1,3-propylene phosphates was synthesized from 2-hydro-2-oxo-1,3,2-dioxaphosphorinane as a monomer. The reaction conditions were similar to those in Example 2. The initiators used in the present study include $C_2H_5$OLi, lithium hexafluoroarsenide ($LiAsF_6$), lithium trifluoro-methanesulfonate ($LiCF_3SO_3$), lithium hexafluorophosphate ($LiPF_6$), or a mixture of $C_2H_5$Oli with any one of these 3 lithium salts. The reactive liquid electrolyte composition was then injected into a dry cell. The reaction temperature was from 25° C. to 120° C. (preferably 40-60° C.) and the required time was from 5 hours to 24 hours. The cells for each electrolyte composition included a lithium/NCM-532 cell (initially the cell being lithium-free) and lithium-ion cell containing a Si-based anode and a NCM-532 cathode.

Additionally, polymerization with different initiators or initiator combinations were prepared ex situ in a beaker in order to determine the polymerization yields and lithium-ion conductivity values (with samples cast on a glass surface. The results are summarized in Table 1 below.

TABLE 1

| Sample No. | Initiator(s), 0.2% by wt. in electrolyte composition | Lithium salt (10%, if present) | Polymer yield | Lithium-ion conductivity (S/cm) |
|---|---|---|---|---|
| 1a, 1b | $C_2H_5$OLi | 1a: $LiPF_6$; 1b: none | 90%; 88% | 1a: $4.8 \times 10^{-4}$ |
| 2a, 2b | $LiAsF_6$ | 2a: $LiPF_6$; 2b: none | 93%; 95% | 1a: $6.7 \times 10^{-4}$ ($4.8 \times 10^{-3}$, with 12% solvent) |
| 3a, 3b | $LiCF_3SO_3$ | 3a: $LiPF_6$; 3b: none | 93%; 95% | 1a: $2.5 \times 10^{-4}$ |
| 4a, 4b | $LiPF_6$ | 4a: $LiPF_6$; 4b: none | 92%; 94% | 1a: $4.3 \times 10^{-4}$ ($3.5 \times 10^{-3}$, with 28% solvent) |
| 5a, 5b | $C_2H_5$Oli + $LiAsF_6$ | 5a: $LiAsF_6$; 5b: none | 91%; 94% | 1a: $5.8 \times 10^{-4}$ |
| 6a, 6b | $C_2H_5$Oli + $LiCF_3SO_3$ | 6a: $LiCF_3SO_3$; 6b: none | 91%; 93% | 1a: $6.2 \times 10^{-4}$ |
| 7 | $C_2H_5$Oli + $LiPF_6$ | none | 90% | — |

These data indicate that the lithium salts commonly used in a lithium-ion battery are effective initiators for promoting polymerization of 2-hydro-2-oxo1,3,2-dioxaphosphorinan. The lithium-ion conductivity values of the resulting solid-state electrolytes are surprisingly good as compared to other polymer or inorganic solid electrolytes.

The polymerization reaction for poly(P-hydro 1,3-propylene phosphonate) is shown below:

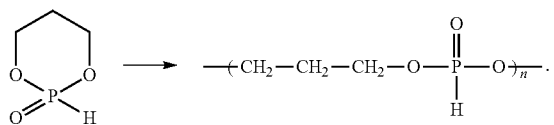

Additionally, layers of polymer electrolytes were cast on glass surfaces and polymerized under comparable conditions. The lithium ion conductivity of these solid-state electrolytes was measured.

Alternatively, poly(ethylene H-phosphonate) can he synthesized from di(2-chloroethyl) H-phosphonate by thermal homopolycondensation with elimination of dichloroethane:

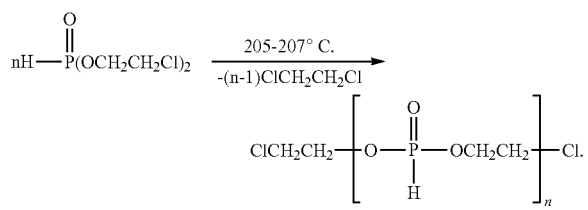

However, this procedure is not suitable for in situ polymerization inside the battery cell dues to the excessively high reaction temperatures.

EXAMPLE 4

Preparation of Solid Electrolyte Powder, Lithium Nitride Phosphate Compound (LIPON) for Use as a Solid Filler or Additive Particles of $Li_3PO_4$ (average particle size 4 μm) and urea were prepared as raw materials; 5 g each of $Li_3PO_4$ and urea was weighed and mixed in a mortar to obtain a raw material composition. Subsequently, the raw material composition was molded into 1 cm×1 cm×10 cm rod with a molding machine, and the obtained rod was put into a glass tube and evacuated. The glass tube was then subjected to heating at 500° C. for 3 hours in a tubular furnace to obtain a lithium nitride phosphate compound (LIPON). The compound was ground in a mortar into a powder form. These particles can be added into an elastic polymer matrix, along with a desired anode active material or cathode active material to make an anode or a cathode, respectively.

EXAMPLE 5

Preparation of Solid Electrolyte Powder, Lithium Superionic Conductors with the $Li_{10}GeP_2S_{12}$ (LGPS)-Type Structure The starting materials, $Li_2S$ and $SiO_2$ powders, were milled to obtain fine particles using a ball-milling apparatus. These starting materials were then mixed together with $P_2S_5$ in the appropriate molar ratios in an Ar-filled glove box. The mixture was then placed in a stainless steel pot, and milled for 90 min using a high-intensity ball mill. The specimens were then pressed into pellets, placed into a graphite crucible, and then sealed at 10 Pa in a carbon-coated quartz tube. After being heated at a reaction temperature of 1,000° C. for 5 h, the tube was quenched into ice water. The resulting solid electrolyte material was then subjected to grinding in a mortar to form a powder sample to be later added as an inorganic solid electrolyte particles dispersed in an intended elastic polymer matrix.

EXAMPLE 6

Preparation of Garnet-Type Solid Electrolyte Powder

The synthesis of the $c\text{-}Li_{6.25}Al_{0.25}La_3Zr_2O_{12}$ was based on a modified sol-gel synthesis-combustion method, resulting in sub-micron-sized particles after calcination at a temperature of 650° C. (J. van den Broek, S. Afyon and J. L. M. Rupp, Adv. Energy Mater., 2016, 6, 1600736).

For the synthesis of cubic garnet particles of the composition $c\text{-}Li_{6.25}Al_{0.25}La_3Zr_2O_{12}$, stoichiometric amounts of $LiNO_3$, $Al(NO_3)_3\text{-}9H_2O$, $La(NO_3)_3\text{-}6(H_2O)$, and zirconium (IV) acetylacetonate were dissolved in a water/ethanol mixture at temperatures of 70° C. To avoid possible Li-loss during calcination and sintering, the lithium precursor was taken in a slight excess of 10 wt % relative to the other precursors. The solvent was left to evaporate overnight at 95° C. to obtain a dry xerogel, which was ground in a mortar and calcined in a vertical tube furnace at 650° C. for 15 h in alumina crucibles under a constant synthetic airflow. Calcination directly yielded the cubic phase $c\text{-}Li_{6.25}Al_{0.25}La_3Zr_2O_{12}$, which was ground to a fine powder in a mortar for further processing.

The $c\text{-}Li_{6.25}Al_{0.25}La_3Zr_2O_{12}$ solid electrolyte pellets with relative densities of ~87±3% made from this powder (sintered in a horizontal tube furnace at 1070° C. for 10 h under $O_2$ atmosphere) exhibited an ionic conductivity of ~0.5× $10^{-3}$ S cm$^{-1}$ (RT). The garnet-type solid electrolyte with a composition of $c\text{-}Li_{6.25}Al_{0.25}La_3Zr_2O_{12}$ (LLZO) in a powder form was dispersed in several electric, ion-conducting polymers discussed earlier.

EXAMPLE 7

Preparation of Sodium Superionic Conductor (NASICON) Type Solid Electrolyte Powder The $Na_{3.1}Zr_{1.95}M_{0.05}Si_2PO_{12}$ (M=Mg, Ca, Sr, Ba) materials were synthesized by doping with alkaline earth ions at octahedral 6-coordination Zr sites. The procedure employed includes two sequential steps. Firstly, solid solutions of alkaline earth metal oxides (MO) and $ZrO_2$ were synthesized by high energy ball milling at 875 rpm for 2 h. Then NASICON $Na_{3.1}Zr_{1.95}M_{0.05}Si_2PO_{12}$ structures were synthesized through solid-state reaction of $Na_2CO_3$, $Zr_{1.95}M_{0.05}O_{3.95}$, $SiO_2$, and $NH_4H_2PO_4$ at 1260° C.

The invention claimed is:

1. A rechargeable lithium battery comprising an anode, a cathode, and a quasi-solid or solid-state electrolyte in ionic communication with the anode and the cathode, wherein the electrolyte comprises a polymer comprising chains of a polyester of phosphoric acid and a lithium salt dissolved or dispersed in the polyester of phosphoric acid, represented by the following structure:

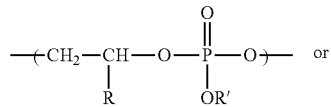

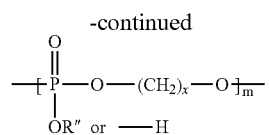

wherein (i) $3 \leq x \leq 10$, R is selected from Li, H, a methyl, ethyl, propyl, vinyl, allyl, acrylate, phenol, alkyl, aryl, or $CH_2Cl$, and R' or R" is independently selected from Li, $CH_3$, $C_2H_5$, n-$C_3H_7$, i-$C_3H_7$; n-$C_4H_9$, $CCl_3CH_2$, $C_6H_5$, —OH, —COOH, —O—$CH_2CH_2$—R''', an alkyl, or an aryl, where R'''=—$(CH_2)_yCH_3$ and $0 \leq y \leq 10$; or (ii) $x=2$, R is selected from Li, H, a methyl, ethyl, propyl, vinyl, allyl, acrylate, or $CH_2Cl$, and R' or R" is independently selected from $CH_3$, $C_2H_5$, n-$C_3H_7$, i-$C_3H_7$; n-$C_4H_9$, $CCl_3CH_2$, $C_6H_5$, —OH, —COOH, vinyl, allyl, or acrylate; and wherein the lithium salt occupies a weight fraction from 0.1% to 50% based on the total weight of the lithium salt and the polyester of phosphoric acid combined, wherein m is an integer, wherein the polyester of phosphoric acid forms a crosslinked network with an amide group selected from N,N-dimethylacetamide, N,N-diethylacetamide, N,N-dimethylformamide, N,N-diethylformamide, or a combination thereof.

2. The rechargeable lithium battery of claim 1, wherein the lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

3. The rechargeable lithium battery of claim 1, wherein the electrolyte further comprises from 0.1% to 50% by weight of a non-aqueous liquid solvent dispersed in the polyester of phosphoric acid by weight, based on the total weight of the lithium salt, the polyester of phosphoric acid, and the non-aqueous liquid solvent combined.

4. The rechargeable lithium battery of claim 3, wherein the liquid solvent is selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), an ionic liquid solvent, or a combination thereof.

5. The rechargeable lithium battery of claim 4, wherein the sulfone or sulfide is selected from vinyl sulfone, allyl sulfone, alkyl vinyl sulfone, aryl vinyl sulfone, vinyl sulfide, a vinyl-containing variant of TrMS, MTrMS, TMS, EMS, MMES, EMES, EMEES, or a combination thereof:

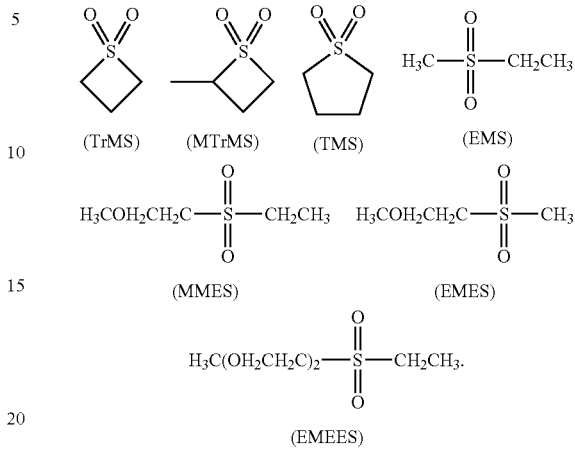

6. The rechargeable lithium battery of claim 5, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfide, divinyl sulfone, or a combination thereof, wherein the vinyl sulfone does not include methyl ethylene sulfone and ethyl vinyl sulfone.

7. The rechargeable lithium battery of claim 4, wherein the nitrile comprises a dinitrile or is selected from AND, GLN, SEN, or a combination thereof:

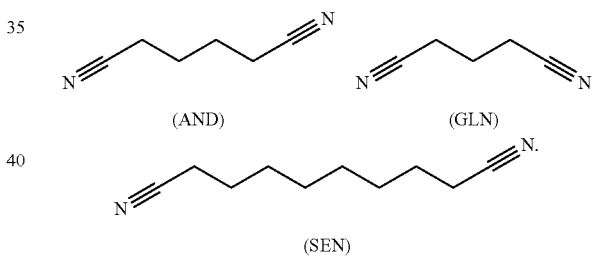

8. The rechargeable lithium battery of claim 4, wherein the phosphate is selected from allyl-type, vinyl-type, styrenic-type and (meth)acrylic-type monomers bearing a phosphonate moiety.

9. The rechargeable lithium battery of claim 4, wherein the phosphate, phosphonate, phosphonic acid, phosphazene, or phosphite is selected from TMP, TEP, TFP, TDP, DPOF, DMMP, DMMEMP, tris(trimethylsilyl)phosphite (TTSPi), alkyl phosphate, triallyl phosphate (TAP), a combination thereof, wherein TMP, TEP, TDP, DPOF, DMMP, DMMEMP, and phosphazene have the following chemical formulae:

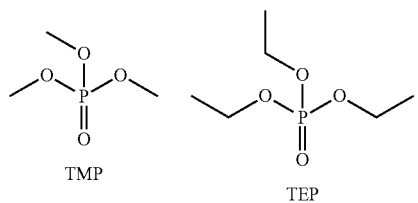

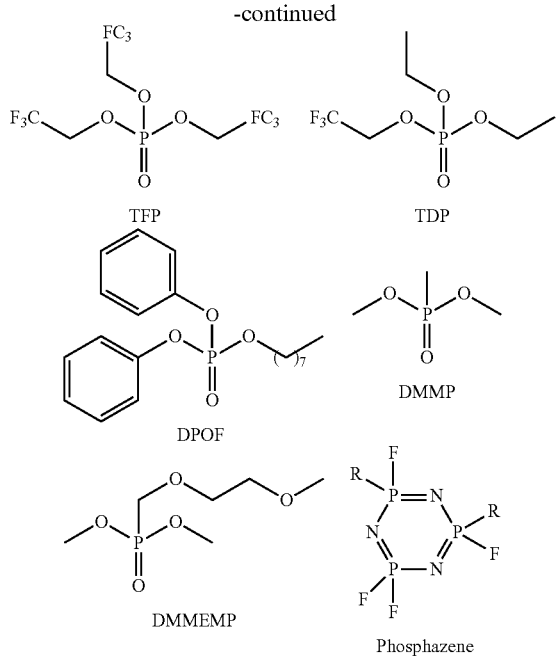

wherein R=H, NH$_2$, or C$_1$-C$_6$ alkyl.

10. The rechargeable lithium battery of claim 4, wherein the siloxane or silane is selected from alkylsiloxane (Si—O), alkyylsilane (Si—C), liquid oligomeric silaxane (—Si—O—Si—), or a combination thereof.

11. The rechargeable lithium battery of claim 1, wherein the polyester of phosphoric acid is crosslinked by a crosslinking agent that comprises a compound having at least one reactive group selected from a hydroxyl group, an amino group, an imino group, an amide group, an acrylic amide group, an amine group, an acrylic group, an acrylic ester group, or a mercapto group in the molecule.

12. The rechargeable lithium battery of claim 1, wherein the polyester of phosphoric acid is crosslinked by a crosslinking agent selected from poly(diethanol) diacrylate, poly(ethyleneglycol)dimethacrylate, poly(diethanol) dimethylacrylate, poly(ethylene glycol) diacrylate, or a combination thereof.

13. The rechargeable lithium battery of claim 1, wherein said electrolyte further comprises a flame-retardant additive selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

14. The rechargeable lithium battery of claim 13, wherein said flame retardant additive is in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

15. The rechargeable lithium battery of claim 1, wherein said polymer forms a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate, poly(ethylene glycol) methyl ether acrylate, a sulfonated derivative thereof, or a combination thereof.

16. The rechargeable lithium battery of claim 1, wherein said polymer further comprises an inorganic solid electrolyte material in a fine powder form having a particle size from 2 nm to 30 µm, wherein said particles of inorganic solid electrolyte material are dispersed in said polymer or chemically bonded by said polymer.

17. The rechargeable lithium battery of claim 16, wherein said particles of inorganic solid electrolyte material are selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

18. The rechargeable lithium battery of claim 1, which is a lithium metal secondary cell, a lithium-ion cell, a lithium-sulfur cell, a lithium-ion sulfur cell, a lithium-selenium cell, or a lithium-air cell.

19. The rechargeable lithium battery of claim 1, wherein the cathode comprises a cathode active material selected from lithium nickel manganese oxide (LiNi$_a$Mn$_{2-a}$O$_4$, 0<a<2), lithium nickel manganese cobalt oxide (LiNi$_n$Mn$_m$Co$_{1-n-m}$O$_2$, 0<n<1, 0<m<1, n+m<1), lithium nickel cobalt aluminum oxide (LiNi$_c$Co$_d$Al$_{1-c-d}$O$_2$, 0<c<1, 0<d<1, c+d<1), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

20. The rechargeable lithium battery of claim 1, which is a lithium-ion cell wherein the anode comprises an anode active material selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, ZnCo$_2$O$_4$; (f) carbon or graphite particles (g) prelithiated versions thereof; and (h) combinations thereof.

21. The rechargeable lithium battery of claim 1, further comprising a separator disposed between the anode and the cathode wherein the separator comprises the quasi-solid or the solid-state electrolyte.

22. The rechargeable lithium battery of claim 1, wherein the electrolyte comprises a polymer comprising chains of a polyester of phosphoric acid and a lithium salt dissolved or dispersed in the polyester of phosphoric acid, represented by the following structure:

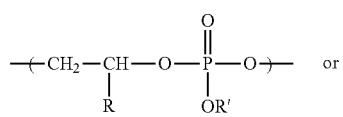

-continued

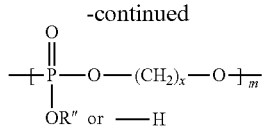

5 wherein 2≤n≤10, R is selected from Li, H, a methyl, ethyl, propyl, vinyl, allyl, acrylate, phenol, alkyl, aryl, or $CH_2Cl$, and R' or R" is independently selected from Li, $CH_3$, $C_2H_5$, n-$C_3H_7$, i-$C_3H_7$; n-$C_4H_9$, $CCl_3CH_2$, $C_6H_5$, —OH, —COOH, —O—$CH_2CH_2$—R''', an alkyl, or an aryl, where R'''=—$(CH_2)_yCH_3$ and 0≤y≤10; and wherein the lithium salt occupies a weight fraction from 0.1% to 50% based on the total weight of the lithium salt and the polyester of phosphoric acid combined.

23. The rechargeable lithium battery of claim 22, further comprising polymeric fibers, ceramic fibers, glass fibers, or a combination thereof, which are dispersed in or bonded by the polymer.

24. An electrolyte composition comprising a lithium salt and an initiator or a crosslinking agent dissolved or dispersed in a reactive liquid medium comprising a reactive monomer or oligomer for a polyester of phosphoric acid and an optional non-aqueous liquid solvent, wherein the polyester of phosphoric acid is represented by the following structure:

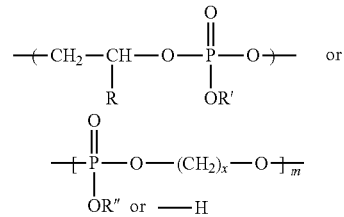

wherein (i) 3<x≤10, R is selected from Li, H, a methyl, ethyl, propyl, vinyl, allyl, acrylate, phenol, alkyl, aryl, or CH2C1, and R' or R" is independently selected from Li, $CH_3$, $C_2H_5$, n-$C_3H_7$, i-$C_3H_7$; n-$C_4H_9$, $CCl_3CH_2$, $C_6H_5$, -OH, -COOH, -O-$CH_2CH_2$-R''', an alkyl, or an aryl, where R'''=—$(CH_2)_yCH_3$ and 0≤y≤10; or (ii) x=2, R is selected from Li, H, a methyl, ethyl, propyl, vinyl, allyl, acrylate, or $CH_2Cl$, and R' or R" is independently selected from $CH_3$, $C_2H_5$, n-$C_3H_7$, i-$C_3H_7$; n-$C_4H_9$, $CCl_3CH_2$, C6H5, —OH, —COOH, vinyl, allyl, or acrylate, wherein the polyester of phosphoric acid forms a crosslinked network with an amide group selected from N,N-dimethylacetamide, N,N-diethylacetamide, N,N-dimethylformamide, N,N-diethylformamide, or a combination thereof.

* * * * *